US012553847B2

(12) United States Patent
Sui et al.

(10) Patent No.: US 12,553,847 B2
(45) Date of Patent: Feb. 17, 2026

(54) ADDITIVELY FABRICATED CAPACITIVE SOIL MOISTURE SENSOR

(71) Applicant: THE REGENTS OF THE UNIVERSITY OF COLORADO, A BODY CORPORATE, Boulder, CO (US)

(72) Inventors: Yongkun Sui, Danbury, CT (US); Madhur Bharath Atreya, Louisville, CO (US); Gregory Lewis Whiting, Boulder, CO (US); Jenna Nielson, Longmont, CO (US)

(73) Assignee: The Regents of the University of Colorado, a body corporate, Boulder, CO (US)

( * ) Notice: Subject to any disclaimer, the term of this patent is extended or adjusted under 35 U.S.C. 154(b) by 240 days.

(21) Appl. No.: 18/263,374

(22) PCT Filed: Jan. 27, 2022

(86) PCT No.: PCT/US2022/014126
§ 371 (c)(1),
(2) Date: Jul. 28, 2023

(87) PCT Pub. No.: WO2022/165057
PCT Pub. Date: Aug. 4, 2022

(65) Prior Publication Data
US 2024/0077446 A1    Mar. 7, 2024

Related U.S. Application Data

(60) Provisional application No. 63/143,672, filed on Jan. 29, 2021.

(51) Int. Cl.
*G01N 27/22* (2006.01)
*G01N 33/24* (2006.01)

(52) U.S. Cl.
CPC ........ *G01N 27/223* (2013.01); *G01N 33/246* (2013.01)

(58) Field of Classification Search
CPC .. G01N 27/223; G01N 33/246; G01N 33/245; A01G 25/167
See application file for complete search history.

(56) References Cited

U.S. PATENT DOCUMENTS

2007/0273394 A1*  11/2007  Tanner .................... G01P 13/02
                                                       324/664
2014/0035599 A1*   2/2014  Shimata ............. G01R 27/2605
                                                       29/850

(Continued)

OTHER PUBLICATIONS

Subash Dahal et al. Degradability of Biodegradable Soil Moisture Sensor Components and Their Effect on Maize (Year: 2020).*

(Continued)

*Primary Examiner* — Alvaro E Fortich
(74) *Attorney, Agent, or Firm* — Workman Nydegger (57) ABSTRACT

A capacitive soil moisture sensor for detecting moisture levels in soil comprises a biodegradable substrate. A capacitive circuit is positioned on the biodegradable substrate. An antenna circuit is configured to communicate capacitance data. A hydrophobic, biodegradable encapsulating material encases at least the capacitive circuit.

17 Claims, 5 Drawing Sheets

(56) References Cited

U.S. PATENT DOCUMENTS

2016/0061762 A1* 3/2016 Buss .................... G01N 27/223
   172/1
2020/0246500 A1* 8/2020 Rogers .................... A61L 15/22

OTHER PUBLICATIONS

Chakyar S. P et al., "Measurement of dielectric constant of waxes at different temperatures using split ring resonator structure," 2016 IEEE MTT-S International Microwave and RF Conference (IMaRC), 2016, pp. 1-4.

Dahal et al., "Degradability of Biodegradable Soil Moisture Sensor Components and Their Effect on Maize (*Zea mays* L.} Growth." Sensors, vol. 20, Issue 21, 6154, Oct. 29, 2020, 13 Pages.

Hosni et al., "Microbial degradation of four biodegradable polymers in soil and compost demonstrating polycaprolactone as an ideal compostable plastic," Waste Manage (Oxford), vol. 97, 2019, pp. 105-114.

International Search Report and Written Opinion received for PCT Patent Application No. PCT/US2022/014126, mailed on May 12, 2022, 12 pages.

Kim S. et al., "Inkjet-printed sensors on paper substrate for agricultural applications," 2013 European Microwave Conference, 2013, pp. 866-869.

Kojima Y et al., "Low-Cost Soil Moisture Profile Probe Using Thin-Film Capacitors and a Capacitive Touch Sensor," Sensors—Basel, vol. 16, Issue 8, 2016, pp. 14.

Lee S. et al., "Metal microparticle—Polymer composites as printable, bio/ecoresorbable conductive inks," Materials Today, vol. 21, Issue 3, 2018, pp. 207-215.

Shirahama Y et al., "Implementation of wide range soil moisture profile probe by coplanar plate capacitor on film substrate," 2015 IEEE Sensors, 2015, pp. 1-4.

\* cited by examiner

ADDITIVELY FABRICATED CAPACITIVE SOIL MOISTURE SENSOR

CROSS-REFERENCE TO RELATED APPLICATIONS

This application is a nationalization of and claims priority to PCT Application No. PCT/US2022/014126, filed Jan. 27, 2022, entitled "Additively Fabricated Capacitive Soil Moisture Sensor", which claims priority to and the benefit of U.S. Provisional Patent Application Ser. No. 63/143,672 filed on Jan. 29, 2021, and entitled "ADDITIVELY FABRICATED CAPACITIVE SOIL MOISTURE SENSOR," which application is expressly incorporated herein by reference in its entirety.

GOVERNMENT RIGHTS

This invention was made with government support under grant number DE-AR0001013 awarded by the U.S. Department of Energy. The government has certain rights in the invention.

BACKGROUND

In 2017, the United States spent $359.8 billion on farm production. The two largest expenditures of crop farms were combined crop input (chemicals, fertilizers, and seeds, etc.) and labor, which account for 28.2% and 13.8% of the total expenditure, respectively. The expenditure on labor were increasingly reduced by the mechanization; however, in gaining the labor efficiency from moving to large-scale uniform farming, farmers sacrificed the resource efficiency due to the heterogeneity of farmlands. To further reduce the cost of large-scale farming by tailoring soil and crop management in heterogeneous fields, precision agriculture (PA) technologies have been widely adopted since the early 1990s. Modern PA relies heavily on temporal and site-specific environment, soil, and crop data collected by various sensors.

Irrigated agriculture is the largest consumer (~85-90%) of freshwater with water use efficiency ranging from 72-83% in the US. And such, even a 5% improvement in water use efficiency could translate to billions of gallons freshwater savings annually. At field scale, there is tremendous spatial and temporal variability in soil moisture, hence current practice of uniform irrigation rate results in over or under application of water in different parts of the field. Accordingly, there is a need for accurate and efficient systems for better managing water usage in agriculture.

The subject matter claimed herein is not limited to embodiments that solve any disadvantages or that operate only in environments such as those described above. Rather, this background is only provided to illustrate one exemplary technology area where some embodiments described herein may be practiced.

BRIEF SUMMARY

Disclosed embodiments include a capacitive soil moisture sensor for detecting moisture levels in soil. The capacitive soil moisture sensor comprises a biodegradable substrate. The capacitive soil moisture sensor further comprises a capacitive circuit positioned on the biodegradable substrate. Further, the capacitive soil moisture sensor comprises a hydrophobic, biodegradable encapsulating material encasing at least the capacitive circuit.

Disclosed embodiments also comprise a method for gathering data from a capacitive soil moisture sensor. The method comprises receiving capacitance data from the capacitive soil moisture sensor that is in physical contact with soil. The capacitive soil moisture sensor comprises a biodegradable substrate. The capacitive soil moisture sensor further comprises a capacitive circuit positioned on the biodegradable substrate. Further, the capacitive soil moisture sensor comprises a hydrophobic, biodegradable encapsulating material encasing at least the capacitive circuit.

Additionally, disclosed methods comprise a method for constructing a capacitive soil moisture sensor. The method comprises comprising connecting a capacitive circuit to a biodegradable substrate. The method further comprises encasing the capacitive circuit in a hydrophobic, biodegradable encapsulating material.

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

Additional features and advantages will be set forth in the description which follows, and in part will be obvious from the description, or may be learned by the practice of the teachings herein. Features and advantages of the invention may be realized and obtained by means of the instruments and combinations particularly pointed out in the appended claims. Features of the present invention will become more fully apparent from the following description and appended claims or may be learned by the practice of the invention as set forth hereinafter.

BRIEF DESCRIPTION OF THE DRAWINGS

In order to describe the manner in which the above-recited and other advantages and features can be obtained, a more particular description of the subject matter briefly described above will be rendered by reference to specific embodiments which are illustrated in the appended drawings. Understanding that these drawings depict only typical embodiments and are not therefore to be considered to be limiting in scope, embodiments will be described and explained with additional specificity and detail through the use of the accompanying drawings described below.

DETAILED DESCRIPTION

Disclosed embodiments include a capacitive soil moisture sensor fabricated from biodegradable materials. These capacitive soil moisture sensors are designed to function during the growing season, and then harmlessly degrade afterwards, enabling high-density deployment, eliminating the need for sensor retrieval, and enabling the use of simple devices structures and low-cost materials and fabrication techniques.

The unique physical attributes and uses of the disclosed capacitive soil moisture sensor allow for efficient and accurate retrieval of information about soil moisture, in the form of capacitance data. One of skill in the art will appreciate that the moisture in soil will impact the capacitance measured by a sensor in the soil. The capacitance data can be used to manage the use of irrigation water on fields. For example, a capacitive soil moisture sensor may provide capacitance data that indicates a particular area of a field comprises low soil moisture. In response a properly equipped irrigation system can target the particular area with additional water. In contrast, a capacitive soil moisture sensor may provide capacitance data that indicates a particular area of a field comprises too much soil moisture. In response a properly equipped irrigation system can target the particular area with a reduced amount of water, or no water, until the capacitive soil moisture sensor indicates that the soil moisture is within the desired range.

In at least one embodiment, a capacitive circuit is used to measure the soil moisture. As used herein, a "capacitive circuit" refers to one or more metal traces that are configured to measure a capacitance through soil. The metal traces may consist of a biodegradable material. For example, the capacitive circuit may comprise a water-soluble conductor that is configured to rapidly degrade when placed in contact with water. Additionally or alternatively, an antenna circuit may comprise a water-soluble conductor that is configured to rapidly degrade when placed in contact with water. For example, the capacitive circuit and/or the antenna circuit may comprise a water-soluble zinc electrode printed onto a biodegradable substrate. The Zn electrodes of the capacitive circuit may be treated with acetic acid to improve conductivity. The rapidly degrading substrate and electrode may be encapsulated in a hydrophobic, biodegradable encapsulating material that protects the device, reduces drift, and controls degradation time. For example, the hydrophobic, biodegradable encapsulating material may comprise a slowly degrading wax blend.

Accordingly, the disclosed capacitive soil moisture sensor can respond predictably and stably until the encapsulating material is breached. Once the encapsulating material is breached, the water-soluble conductor within the capacitive circuit and/or the antenna circuit fails rapidly, providing a clear distinction between the functional and non-functional lifetime of the sensor. Accordingly, disclosed embodiments provide a stable sensor reading during the useful life of the sensor and then quickly degrade such that a user is able to easily identify when a capacitive soil moisture sensor is past its useful life. These results demonstrate the potential of biodegradable sensors to allow maintenance-free, affordable, and real-time soil moisture measurement at high spatial density for precision irrigation control.

The following discussion now refers to a number of methods and method acts that may be performed. Although the method acts may be discussed in a certain order or illustrated in a flow chart as occurring in a particular order, no particular ordering is required unless specifically stated, or required because an act is dependent on another act being completed prior to the act being performed.

In at least one embodiment, the capacitive soil moisture sensor is constructed utilizing one or more additive manufacture techniques such as, but not limited to, inkjet-printing, screen-printing, stencil-printing, and extrusion-printing. In at least one embodiment, the capacitive soil moisture sensor may comprise a biodegradable substrate, such as an organic material like balsa wood. The capacitive circuit, antenna circuit, and the encapsulant may be additively manufactured on the substrate. For example, the encapsulant may comprise a slowly degradable hydrophobic encapsulant, such as bees wax and/or soy wax, while the capacitive circuit and/or antenna circuit may comprise a rapidly degradable material such as a water-soluble conductor like zinc.

Figure 1:
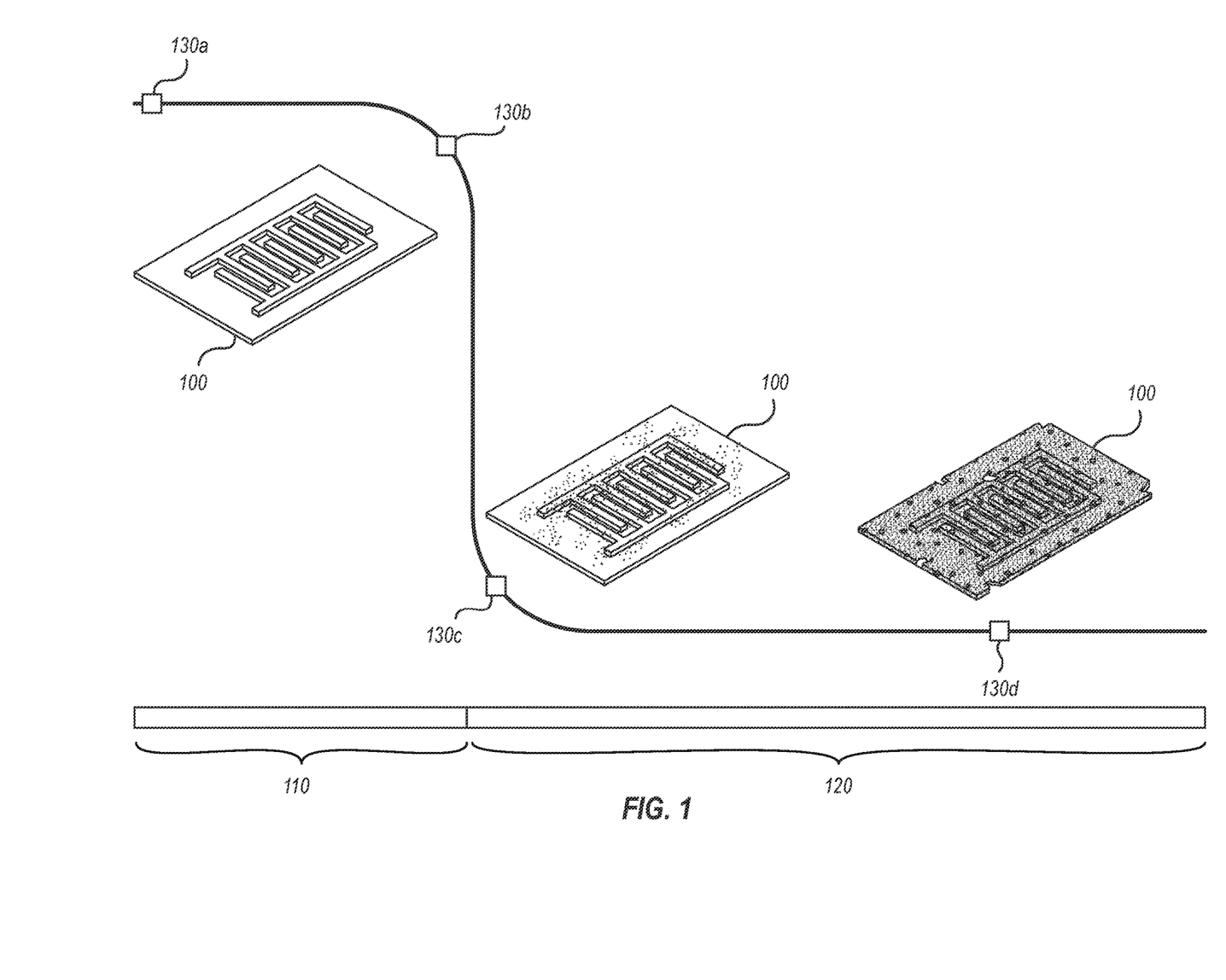
FIG. 1 Illustrates the degradation of the capacitive soil moisture sensor over time.

Such material selection allows the sensor to remain reliably functional for an extended time in the presence of soil microbes then fail rapidly through the electrode decomposition after the encapsulant sufficiently degrades as illustrated in FIG. 1. FIG. 1 illustrates the degradation of the capacitive soil moisture sensor 100 over time. The graph line illustrates the relative capacitance of the circuit over time. The capacitive circuit and/or the antenna circuit is protected by wax during the functioning period 110, but the capacitive circuit breaks down rapidly during a degrading period 120 after encapsulation fails. For example, at time point 130a, the capacitive soil moisture sensor 100 is deposited in soil. At time point 130b, microbes decompose the encapsulating material (also referred to herein as the "encapsulant" or "encapsulating material"). The decomposed encapsulating material allows moisture to contact the water-soluble conductor in the capacitive circuit and/or antenna circuit causing the electrical traces to erode and break. The break in the traces results in an abrupt change in the capacitance in the circuit. At time point 130c, the moisture has substantially decomposed the conductive traces. At point 130d, microbes cause the encapsulant, substrate, and other functional components of the capacitive soil moisture sensor 100 to eventually degrade in soil.

The rapid breakdown allows easy assessment of each sensor's service life so that measurement reliability can be easily established, mitigating potential issues of signal drift. The majority of capacitive soil moisture sensor 100 will eventually decompose completely, eliminating the need for labor-intensive and time-consuming retrieval. The only remaining portion of the capacitive soil moisture sensor 100 may be an integrated circuit that is integrated within the antenna circuit. The Materials selection and ecotoxicity testing suggest that the sensor materials do not hinder the crop growth.

Figure 2:
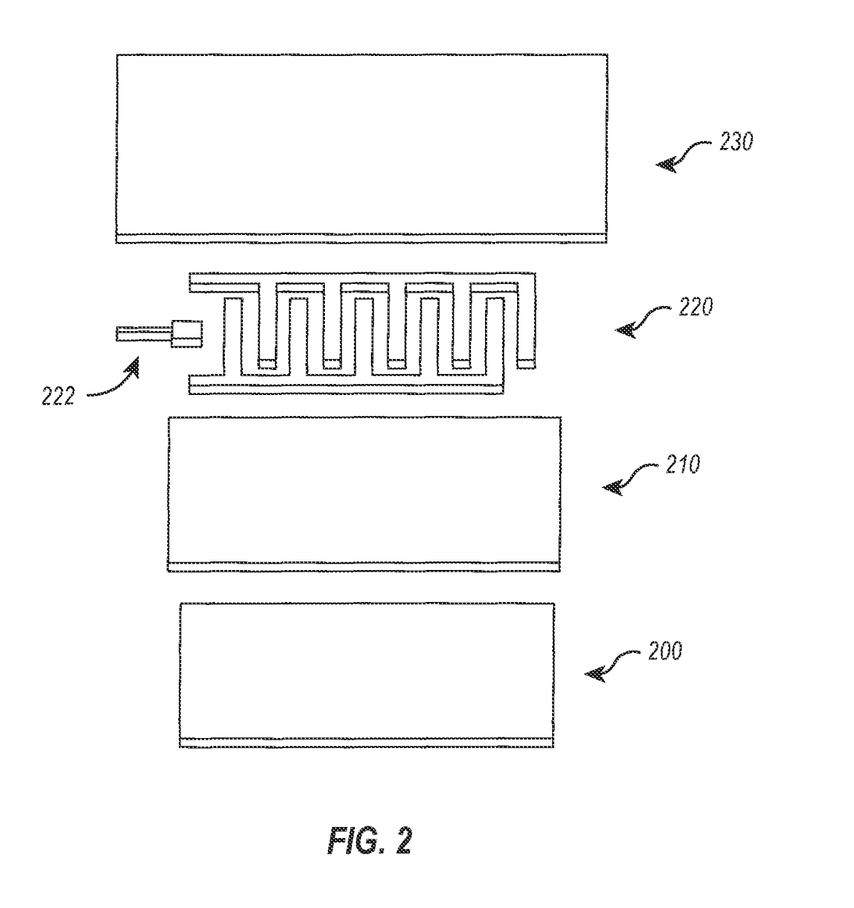
FIG. 2 illustrates an exploded view of the components of a capacitive soil moisture sensor.

As further examples relating to the construction of a capacitive soil moisture sensor, the capacitive soil moisture sensor may comprise a biodegradable substrate, a capacitive circuit and/or an antenna circuit comprising a water-soluble conductor, the capacitive circuit and antenna circuit positioned on the biodegradable substrate, and a hydrophobic, biodegradable encapsulating material encasing at least the capacitive circuit and the antenna circuit. FIG. 2 depicts an exploded view of the components of a capacitive soil moisture sensor 100. The depicted capacitive soil moisture sensor 100 comprises a balsa wood sheet as the structural substrate 200, a PHBV film as the printing substrate 210, printed Zn traces as the capacitive circuit 220, and antenna circuit 222, and a blend of beeswax and soy wax as the encapsulant 230.

The balsa wood provides structural support to the sensor to prevent the electrodes in the capacitive circuit 220 from deformation in soil. Balsa was chosen as the structural material due to its poor resistance to microbial degradation. The balsa wood degraded rapidly in moist soil and does not leave environmentally harmful chemicals behind. A poly (3-hydroxybutyate-co-3-hydroxyvalerate (PHBV) film was used as the printing substrate 210. PHBV is a microbially-derived polymer which rapidly degrades in soil and is generally considered non-ecotoxic. Portions of the capacitive circuit and/or the antenna circuit 222 may be printed using a Zn/PVP conductive ink.

The biodegradable substrate may comprise an organic material, such as wood or plant fiber. For example, the substrate may comprise balsa wood or delignified balsa wood. The capacitive circuit and/or the antenna circuit may comprise a water-soluble conductor, such as Zinc (Zn) microparticles, with a water-soluble binder, such as Polyvinylpyrrolidone (PVP), on with a poly film (3-hydroxybutyrate-co-3-hydroxyvalerate) (PHBV) for a printing surface. The zinc may comprise 5 μm microparticles. The PHBV may comprise 8% polyhydroxyvalerate with a thickness of 0.025 mm. The encapsulant may comprise hydrophobic, biodegradable encapsulating material, such as a mixture of beeswax and soy wax.

In at least one embodiment, the hydrophobic, biodegradable encapsulating material is configured to encase at least the capacitive circuit 220 and/or the antenna circuit 222 with a thickness that is determined based at least upon a desired sensitivity of the capacitive soil moisture sensor 100 and a desired life of the capacitive soil moisture sensor 100. For example, the capacitive circuit may be printed using a Zn/PVP conductive ink. One of skill in the art will appreciate that Zn/PVP composite ink displays rapid dissolution in water. For example, in one experiment the initial resistance of the Zn trace may is 10Ω. Ten seconds after the trace was immersed in de-ionized (DI) water, the resistance suddenly rose to sub-100Ω, which was caused by the erosion of the Zn trace. Then the resistance rapidly increased by over 2 orders of magnitudes to 20 kΩ, indicating breakage and loss of electrical continuity.

In at least one embodiment, the capacitive circuit 220, at least portions of the antenna circuit 222, and the substrates 200 are made of materials that degrade rapidly when exposed to wet soil in order to ensure clear failure of the capacitive soil moisture sensor 100. To provide useful, functional, stable sensor operation in soil, a slowly degrading hydrophobic encapsulant is used to protect the capacitive soil moisture sensor 100 and reduce signal drift. A blend of beeswax and soy wax was chosen for this purpose as it is hydrophobic, and as its biodegradability in soil is known for biostimulation and bioremediation applications. Beeswax and soy wax display differing mechanical and degradation properties, and by blending them the desired film forming and degradation properties can be achieved. For example, beeswax provides a strong water barrier for the capacitive circuit 220 while soy wax tends to degrade more rapidly in soil due to microbial activity with respect to the soy wax. Accordingly, the encapsulating material 230 may be tuned based upon the expected moisture level in the target soil and based upon the target life span of the capacitive soil moisture sensor 100. In relatively high moisture soils, it may be necessary to include a greater proportion of beeswax to soy wax in order to extend the life of the capacitive soil moisture sensor 100. In contrast, in relatively low moisture soils, it may be necessary to include a greater proportion of soy wax to beeswax in order to ensure that the capacitive soil moisture sensor 100 degrades quickly after its useful life. Additionally, the thickness of the encapsulant 230 can also be varied in order to properly tune the capacitive soil moisture sensor 100. If the ratios of components within the encapsulating material 230 are maintained, then a thicker encapsulating material 230 will exhibit a longer life. However, as explained below, the thicker encapsulating material 230 may also reduce the sensitivity of the capacitive circuit 220.

Figure 3:
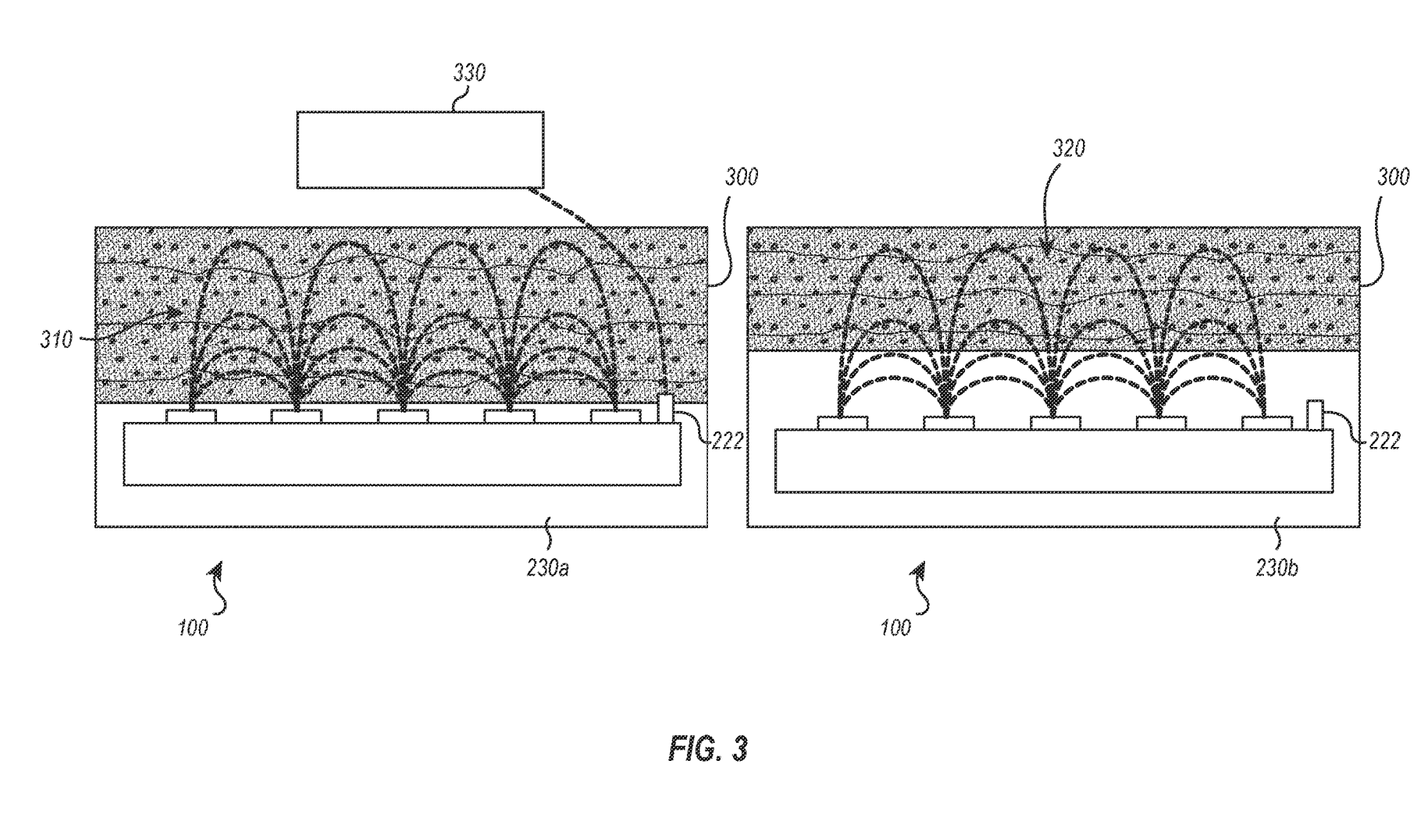
FIG. 3 illustrates a diagram of capacitive soil moisture sensors operating within soil.

FIG. 3 illustrates a diagram of capacitive soil moisture sensors 100 operating within soil 300. The thickness of the encapsulant 230a, 230b on top of the capacitive circuit 220 impacts the electric fields 310, 320 generated by the capacitive circuit in the surrounding soil 300. The dielectric constant of beeswax measured at 3 GHz is 1.8 at 30° C., which is similar to the reported dielectric constant of dry soil measured at a similar frequency. Therefore, the capacitive soil moisture sensors 100 with encapsulants 230a, 230b of different thickness should read similar capacitances in dry soil. However, because the strength of the electrical field decreases as a function of distance from the electrodes, when the soil is wet and has a higher dielectric constant, the sensor with a thinner wax encapsulation is expected to read a higher capacitance.

In an experiment, capacitive soil moisture sensor 100 with 0.8 mm-, 1.0 mm-, and 1.5 mm-thick wax encapsulation were fabricated and calibrated in soil samples of different moisture levels. The experiment used soil volumetric water content (VWC) as the parameter under test, which is calculated using the formula:

$$\theta_V = \frac{\text{volume}_{water}}{\text{volume}_{soil}} = \frac{m_{water} \cdot \rho_{soil}}{\rho_{water} \cdot m_{soil}} \qquad \text{Equation 1}$$

where $m_{water}$ and $m_{soil}$ stand for the mass of water and dry soil, respectively; $\rho_{water}$ and $\rho_{soil}$ stand for the density of water and bulk soil, respectively. All three sensors exhibited a roughly linear response to moisture levels from dry to saturation (72%). The R-square values of the linearly fitted curves are 0.99, 0.97, and 0.99 for the sensors with 0.8 mm, 1.0 mm, and 1.5 mm encapsulation, respectively. As predicated, the sensor with the thinnest encapsulation (0.8 mm) has a highest sensitivity of 76 fF/VWC %. The sensors with 1.0 mm and 1.5 mm encapsulation have a lower sensitivity of 56 fF/VWC % and 33 fF/VWC %, respectively. The sensitivity of the sensor with 1.0 mm encapsulation was also characterized in sand. The sensitivity was 39 fF/VWC %, which is lower than the sensitivity in potting soil. The difference is expected because soil, depending on its texture (i.e., percentage of sand, silt, and clay), has different bulk density and water holding capacity.

Accordingly, a capacitive soil moisture sensor 100 can be calibrated for each type of soil for field applications. The sensitivity of capacitive soil moisture sensor 100 can be tuned by a number of factors such as the geometry of the electrodes, the frequency and amplitude of the measuring signal, and the thickness of the coating. For the biodegradable moisture sensors, the thickness of the encapsulant also affects the service life of the sensors. Therefore, if higher sensitivity is required by the measuring system, it may be advisable to increase the number of interdigitated electrodes by using larger devices and/or higher resolution prints.

Disclosed embodiments comprise a capacitive soil moisture sensor 100 comprising slowly degradable encapsulant 230 and rapidly degradable capacitive circuit 220 and/or antenna circuit 222. This material combination allows the sensor to function stably without significant signal drift for an extended period in soil then rapidly break down after the encapsulation fails, ensuring a clear distinction between functional and non-functional states. The sensor may be calibrated in soil samples with moisture levels from dry to saturated and exhibit a linear response to changes in VWC, with sensitivity of the sensor determined by the thickness of the encapsulant. The reading and sensitivity of the moisture sensor drift as the encapsulant degrades is small compared to the absolute capacitance and linear, and thus can be corrected in the measurement system. For most crops, functional lifetimes of at least 100 days are required. As demonstrated, through control of the dimensions and composition of the encapsulant, the functional lifetime of the sensor can be tuned.

In at least one embodiment, the antenna circuit 222 may be integrated with a passive radio-frequency-identification (RFID) chip with an analog-to-digital input. This will allow wireless readout of capacitance data from the sensor in the field (e.g., with a data gathering device 330 mounted to farm equipment), and almost complete degradation (aside from a small silicon IC that would remain in the soil) providing low-cost, maintenance- and retrieval-free operation. The RFID chip may be positioned on the exterior of the capacitive moisture sensor 100 or may be encapsulated by the encapsulating material 230.

The data gathering device 330 may be configured to inductively provide power to capacitive soil moisture sensors 100. As such, the data gathering device 330 can both power the capacitive soil moisture sensors 100 and receive capacitance data from the capacitive soil moisture sensors 100. The ability to inductively power the capacitive soil moisture sensors 100 increases the biodegradability of the capacitive soil moisture sensors 100 by removing the need to on-sensor battery.

As such, at least one embodiment disclosed herein comprises receiving capacitance data from the capacitive soil moisture sensor, the data gathering device 330 in physical contact with soil. Further, the method may comprise inductively powering the capacitive soil moisture sensor 100. In at least one embodiment, the antenna circuit 222 may also provide the data gathering device 330 with a unique identifier value that is associated with its specific capacitive soil moisture sensor 100. The data gathering device 330 can record the identification value, the received capacitive data, and a location value associated with the specific capacitive soil moisture sensor 100. The location value may comprise a GPS coordinate that is received from a GPS radio that is connected to the data gathering device 330. Using this recorded information, the data gathering device 330 can map moisture data to a map of a scanned area. Additionally, the data gathering device 330 can track individual capacitive soil moisture sensors 100 and the performance of individual sensors. By tracking individual capacitive soil moisture sensors 100, the data gathering device 330 may also be able to identify sensors that have previously been identified as having failed. The data gathering device 330 can then disregard any data received from these sensors.

In at least one embodiment, the capacitive circuit 220 may not comprise a water-soluble conductor, but the antenna circuit 222 may instead comprise the water-soluble conductor. For example, it may be beneficial for the capacitive circuit 220 to be constructed of a more durable and slower degrading material. This may allow for a higher reliability in readings received from the capacitive circuit 220. For instance, since the capacitive circuit 220 covers a relatively large portion of the surface area of the substrate 200, a single deformity in the encapsulant 230 or a single hole created by microbials in the encapsulant may cause the entire capacitive circuit 220 to fail. In contrast, the antenna circuit 222 may consume a relatively smaller portion of the substrate 200. As such, the antenna circuit 222 may be less prone to a single defect in the encapsulant 230. Such a configuration may increase the reliability and consistency of useful lifetimes of similarly structured capacitive moisture sensors 100. As used herein, the antenna circuit 222 may comprise any circuitry other than the capacitive circuit 220.

Figure 4:
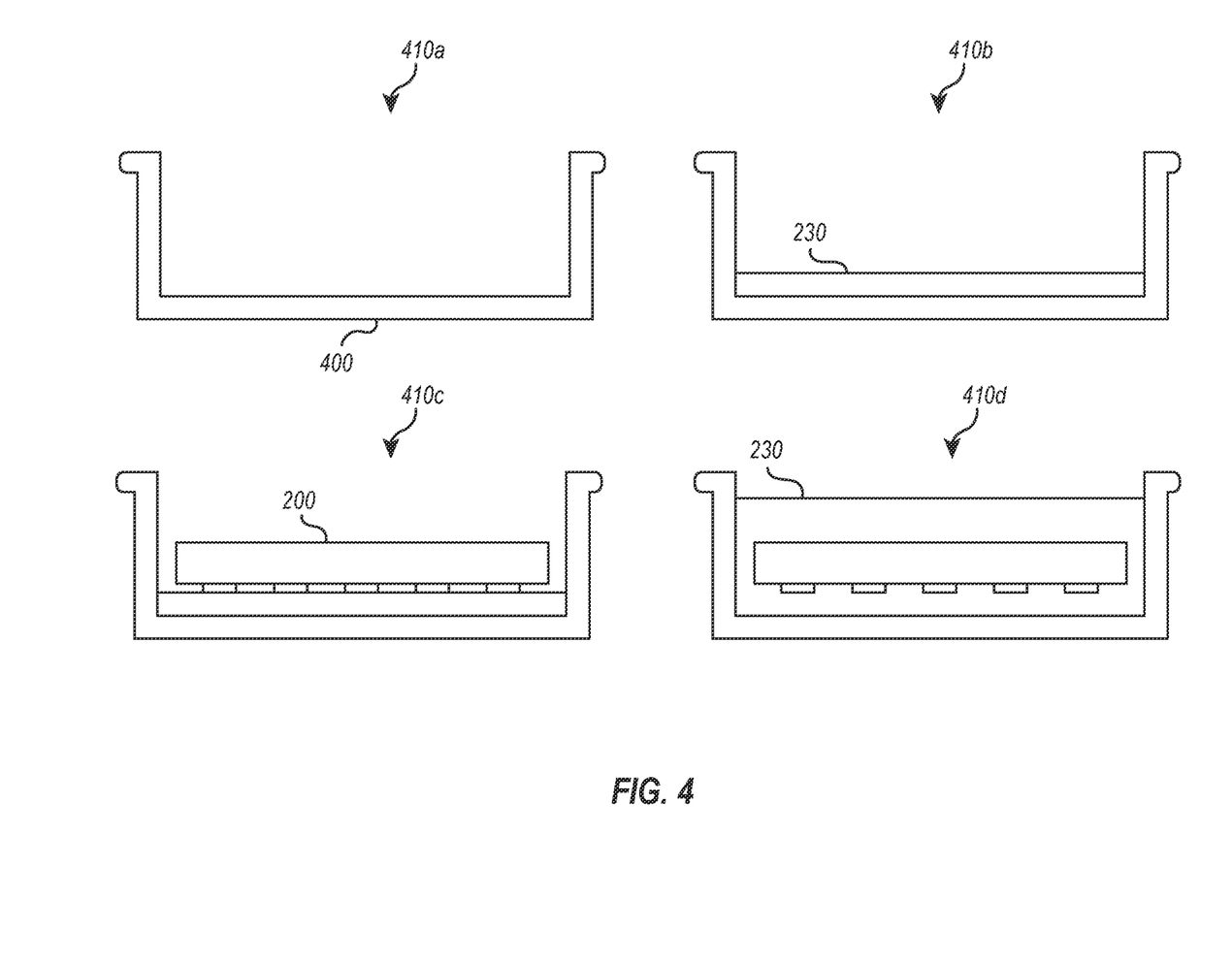
FIG. 4 illustrates a process for constructing a capacitive soil moisture sensor.

FIG. 4 illustrates a process for constructing a capacitive soil moisture sensor. In at least one embodiment, the biodegradable substrate of the capacitive soil moisture sensor 100 is prepared by cutting a ⅛" thick balsa wood sheet into rectangle pieces of 7 mm×3.5 mm. The printing substrate PHBV 210 is cut into the same dimension then adhered to the balsa wood (i.e., substrate 200) using melted beeswax (i.e., encapsulant 230). The PHBV film may be cleaned with IPA before the stencil printing of the capacitive circuit 220 and/or the antenna circuit 222. The stencil may be made of a PI tape and patterned using a laser cutter. As shown by 410a, encapsulation of the capacitive soil moisture sensor 100 may be performed in a silicone mold 400. For instance, as shown in 410b, a controlled amount of melted wax encapsulant 230 may be poured into the silicone mold 400. The wax encapsulant 230 may then be allowed to cool down at room temperature to form the top encapsulation layer for the capacitive soil moisture sensor. As shown in 410c, the substrate 200, capacitive circuit 220, and antenna circuit 222 are then placed on the solidified wax with the printed side facing down. Subsequently, as shown in 410d, more melted wax is poured into the silicone mold to entirely cover the sensor then let cool down at room temperature.

Figure 5:
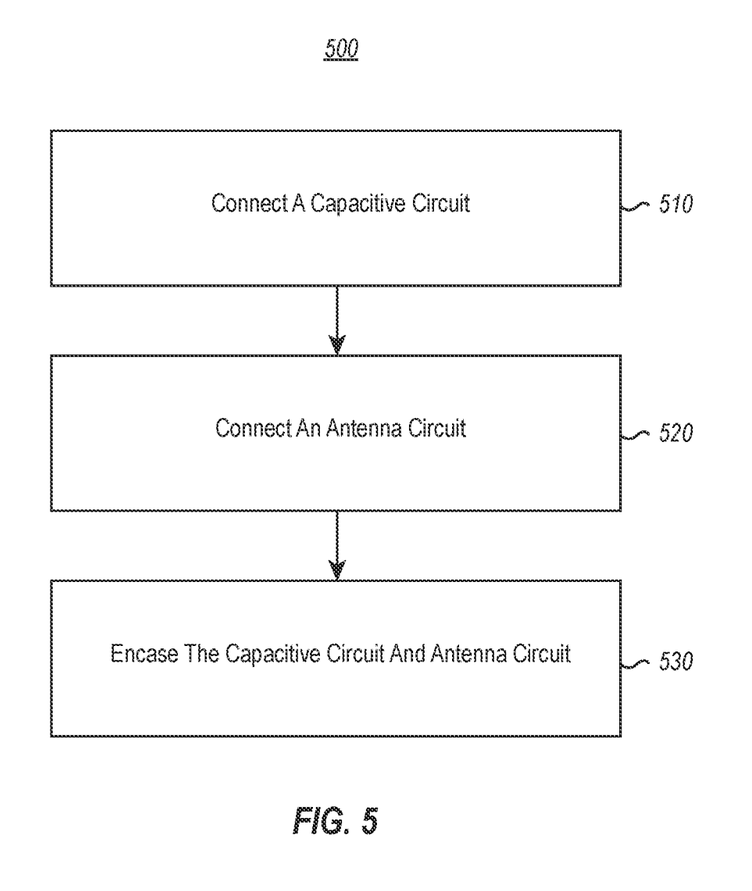
FIG. 5 illustrates a flow chart of steps in a method for constructing a capacitive soil moisture sensor.

FIG. 5 illustrates a flow chart of steps in a method 500 for constructing a capacitive soil moisture sensor. Method 500 comprises an act 510 of connecting a capacitive circuit. Act 510 includes connecting a capacitive circuit 220 to a biodegradable substrate 200. For example, as depicted and described with respect to FIG. 4, conductive traces may be placed on a PHBV film and then connected to the substrate 200.

Additionally, method 500 comprises an act 520 of connecting an antenna circuit. Act 520 includes connecting an antenna circuit 222 to the biodegradable substrate 200. For example, as depicted and described with respect to FIG. 4, conductive traces may be placed on a PHBV film and then connected to the substrate 200 and the capacitive circuit 220. In at least one embodiment, the antenna circuit 222 also comprise a discrete RFID circuit that is also connected to the substrate 200 and to the antenna circuit 222 and capacitive circuit 220.

Further, method 500 comprises an act 530 of encasing the capacitive circuit and the antenna circuit. Act 530 includes encasing the capacitive circuit 220 and the antenna circuit 222 in a hydrophobic, biodegradable encapsulating material 230. For example, as depicted and described with respect to FIG. 4, the encapsulating material 230 can be poured into a mold that holds the capacitive circuit 220, the antenna circuit 222, and the substrate. In additional or alternative embodiments, one or more portions of the capacitive soil moisture sensor 100 can also be constructed using additive manufacturing, such as three-dimensional printing.

In addition, as explained above, in at least one embodiment the encasing the capacitive circuit in the hydrophobic, biodegradable encapsulating material comprises identifying a particular encapsulation thickness based at least upon a desired sensitivity of the capacitive soil moisture sensor and a desired life of the capacitive soil moisture sensor. Once identified, the capacitive circuit can be encapsulated in the hydrophobic, biodegradable encapsulating material to the particular encapsulation thickness.

Similarly, as explained above, in at least one embodiment the encasing the capacitive circuit in the hydrophobic, biodegradable encapsulating material comprises identifying a particular mix ratio of beeswax to soy wax based at least upon a desired life of the capacitive soil moisture sensor. In some cases, the mix ratio may comprise a 25% ratio by volume of soy wax to beeswax. Once identified, the capacitive circuit can be encapsulated in the hydrophobic, biodegradable encapsulating material 230 that comprises the particular mix ratio.

Disclosed embodiments may comprise or utilize a special purpose or general-purpose computer including computer hardware, as discussed in greater detail below. Disclosed embodiments also include physical and other computer-readable media for carrying or storing computer-executable instructions and/or data structures. Such computer-readable media can be any available media that can be accessed by a general purpose or special purpose computer system. Computer-readable media that store computer-executable instructions are physical storage media. Computer-readable media that carry computer-executable instructions are transmission media. Thus, by way of example, and not limitation, embodiments of the invention can comprise at least two distinctly different kinds of computer-readable media: physical computer-readable storage media and transmission computer-readable media.

Physical computer-readable storage media includes RAM, ROM, EEPROM, CD-ROM or other optical disk storage (such as CDs, DVDs, etc.), magnetic disk storage or other magnetic storage devices, or any other medium which can be used to store desired program code means in the form of computer-executable instructions or data structures and which can be accessed by a general purpose or special purpose computer.

Those skilled in the art will appreciate that the invention may be practiced in network computing environments with many types of computer system configurations, including, personal computers, desktop computers, laptop computers, message processors, hand-held devices, multi-processor systems, microprocessor-based or programmable consumer electronics, network PCs, minicomputers, mainframe computers, mobile telephones, PDAS, pagers, routers, switches, and the like. The invention may also be practiced in distributed system environments where local and remote computer systems, which are linked (either by hardwired data links, wireless data links, or by a combination of hardwired and wireless data links) through a network, both perform tasks. In a distributed system environment, program modules may be located in both local and remote memory storage devices.

Alternatively, or in addition, the functionality described herein can be performed, at least in part, by one or more hardware logic components. For example, and without limitation, illustrative types of hardware logic components that can be used include Field-programmable Gate Arrays (FPGAs), Program-specific Integrated Circuits (ASICs), Program-specific Standard Products (ASSPs), System-on-a-chip systems (SOCs), Complex Programmable Logic Devices (CPLDs), etc.

The present invention thus concerns inter alia, without being limited thereto, the following aspects:

1. A capacitive soil moisture sensor for detecting moisture levels in soil, comprising: a biodegradable substrate; a capacitive circuit, the capacitive circuit positioned on the biodegradable substrate; and a hydrophobic, biodegradable encapsulating material encasing at least the capacitive circuit.
2. The capacitive soil moisture sensor of preceding aspect 1, wherein the biodegradable substrate comprises an organic material.
3. The capacitive soil moisture sensor of preceding aspects 1 and 2, wherein the biodegradable substrate comprises balsa wood.
4. The capacitive soil moisture sensor of preceding aspects 1-3, wherein the capacitive circuit comprises a water-soluble conductor.
5. The capacitive soil moisture sensor of preceding aspects 1-4, wherein the water-soluble conductor comprises zinc.
6. The capacitive soil moisture sensor of claim 1-5, wherein the capacitive soil moisture sensor comprises an antenna circuit, and the antenna circuit comprises a water-soluble conductor.
7. The capacitive soil moisture sensor of preceding aspects 1-6, wherein the water-soluble conductor comprises zinc.
8. The capacitive soil moisture sensor of preceding aspects 1-7, wherein the capacitive circuit comprises a water-soluble binder.
9. The capacitive soil moisture sensor of preceding aspects 1-8, wherein the hydrophobic, biodegradable encapsulating material comprises beeswax.
10. The capacitive soil moisture sensor of preceding aspects 1-9, wherein the hydrophobic, biodegradable encapsulating material comprises soy wax.
11. The capacitive soil moisture sensor of preceding aspects 1-10, wherein the hydrophobic, biodegradable encapsulating material encases at least the capacitive circuit with a thickness that is determined based at least upon a desired sensitivity of the capacitive soil moisture sensor and a desired life of the capacitive soil moisture sensor.
12. A method for gathering data from a capacitive soil moisture sensor, comprising receiving capacitance data from the capacitive soil moisture sensor, the capacitive soil moisture sensor in physical contact with soil, the capacitive soil moisture sensor comprising a biodegradable substrate; a capacitive circuit, the capacitive circuit positioned on the biodegradable substrate; and a hydrophobic, biodegradable encapsulating material encasing at least the capacitive circuit.
13. A method of preceding aspect 12, further comprising prior to receiving the capacitance data from the capacitive soil moisture sensor, inductively powering the capacitive soil moisture sensor.
14. A method of preceding aspects 12-13 further comprising recording an identification value associated with the capacitive soil moisture sensor.
15. A method of preceding aspects 12-14, further comprising recording a location value associated with the capacitive soil moisture sensor.
16. A method for constructing a capacitive soil moisture sensor, comprising: connecting a capacitive circuit on a biodegradable substrate; and encasing the capacitive circuit in a hydrophobic, biodegradable encapsulating material.
17. A method of preceding aspect 16, wherein the capacitive circuit consists of a water-soluble conductor.
18. A method of preceding aspects 16-17, wherein capacitive soil moisture sensor comprises an antenna circuit constructed of a water-soluble conductor.
19. A method of preceding aspects 16-18, wherein encasing the capacitive circuit in the hydrophobic, biodegradable encapsulating material comprises: identifying a particular encapsulation thickness based at least upon a desired sensitivity of the capacitive soil moisture sensor and a desired life of the capacitive soil moisture sensor; and encapsulating the capacitive soil moisture sensor in the hydrophobic, biodegradable encapsulating material to the particular encapsulation thickness.

20. A method of preceding aspects 16-19, wherein encasing the capacitive circuit in the hydrophobic, biodegradable encapsulating material comprises: identifying a particular mix ratio of beeswax to soy wax based at least upon a desired life of the capacitive soil moisture sensor; and encapsulating the capacitive soil moisture sensor in the hydrophobic, biodegradable encapsulating material that comprises the particular mix ratio.

The present invention may be embodied in other specific forms without departing from its spirit or characteristics. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

What is claimed is:

1. A capacitive soil moisture sensor for detecting moisture levels in soil, comprising:
    a biodegradable substrate;
    a capacitive circuit, wherein:
        the capacitive circuit is positioned on the biodegradable substrate, and
        the capacitive circuit does not comprise a water-soluble conductor;
    an antenna circuit, wherein:
        the antenna circuit is positioned on the biodegradable substrate in communication with the capacitive circuit, and
        a circuit component located between an output of the capacitive circuit and an output of the antenna circuit comprises a degradable conductor that is configured to degrade when exposed to a soil environment; and
    a hydrophobic, biodegradable encapsulating material encasing at least the capacitive circuit and the antenna circuit.

2. The capacitive soil moisture sensor of claim 1, wherein the biodegradable substrate comprises an organic material.

3. The capacitive soil moisture sensor of claim 2, wherein the biodegradable substrate comprises balsa wood.

4. The capacitive soil moisture sensor of claim 1, wherein the water-soluble conductor comprises zinc.

5. The capacitive soil moisture sensor of claim 1, wherein the water-soluble conductor comprises zinc.

6. The capacitive soil moisture sensor of claim 1, wherein the capacitive circuit comprises a water-soluble binder.

7. The capacitive soil moisture sensor of claim 1, wherein the hydrophobic, biodegradable encapsulating material comprises beeswax.

8. The capacitive soil moisture sensor of claim 7, wherein the hydrophobic, biodegradable encapsulating material comprises soy wax.

9. The capacitive soil moisture sensor of claim 7, wherein the hydrophobic, biodegradable encapsulating material encases at least the capacitive circuit with a thickness that is determined based at least upon a desired sensitivity of the capacitive soil moisture sensor and a desired life of the capacitive soil moisture sensor.

10. A method for gathering data from a capacitive soil moisture sensor, comprising:
    receiving capacitance data from the capacitive soil moisture sensor, the capacitive soil moisture sensor in physical contact with soil, the capacitive soil moisture sensor comprising:
        a biodegradable substrate;
        a capacitive circuit, wherein:
            the capacitive circuit positioned on the biodegradable substrate, and
            the capacitive circuit does not comprise a water-soluble conductor;
        an antenna circuit, wherein:
            the antenna circuit is positioned on the biodegradable substrate in communication with the capacitive circuit, and
            a circuit component located between an output of the capacitive circuit and an output of the antenna circuit comprises a degradable conductor that is configured to degrade when exposed to a soil environment; and
        a hydrophobic, biodegradable encapsulating material encasing at least the antenna circuit.

11. The method of claim 10, further comprising:
    prior to receiving the capacitance data from the capacitive soil moisture sensor, inductively powering the capacitive soil moisture sensor.

12. The method of claim 10, further comprising:
    recording an identification value associated with the capacitive soil moisture sensor.

13. The method of claim 10, further comprising:
    recording a location value associated with the capacitive soil moisture sensor.

14. A method for constructing a capacitive soil moisture sensor, comprising:
    connecting a capacitive circuit on a biodegradable substrate, wherein the capacitive circuit does not comprise a water-soluble conductor;
    connecting an antenna circuit on a biodegradable substrate, wherein a circuit component located between an output of the capacitive circuit and an output of the antenna circuit comprises a degradable conductor that is configured to degrade when exposed to a soil environment; and
    encasing the capacitive circuit and the antenna circuit in a hydrophobic, biodegradable encapsulating material.

15. A method of claim 14, wherein the capacitive circuit consists of a water-soluble conductor.

16. The method of claim 14, wherein encasing the capacitive circuit in the hydrophobic, biodegradable encapsulating material comprises:
    identifying a particular encapsulation thickness based at least upon a desired sensitivity of the capacitive soil moisture sensor and a desired life of the capacitive soil moisture sensor; and
    encapsulating the capacitive soil moisture sensor in the hydrophobic, biodegradable encapsulating material to the particular encapsulation thickness.

17. The method of claim 14, wherein encasing the capacitive circuit in the hydrophobic, biodegradable encapsulating material comprises:
    identifying a particular mix ratio of beeswax to soy wax based at least upon a desired life of the capacitive soil moisture sensor; and
    encapsulating the capacitive soil moisture sensor in the hydrophobic, biodegradable encapsulating material that comprises the particular mix ratio.

* * * * *